(12) United States Patent
Suzuki et al.

(10) Patent No.: US 6,229,637 B1
(45) Date of Patent: May 8, 2001

(54) ROTARY APPARATUS AND DEFLECTION-SCANNING APPARATUS USING THE ROTARY APPARATUS

(75) Inventors: Yasuo Suzuki, Numazu; Taku Fukita, Susono, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/157,494

(22) Filed: Sep. 21, 1998

(30) Foreign Application Priority Data

Sep. 24, 1997 (JP) .................................................... 9-276410

(51) Int. Cl.$^7$ .................................................. G02B 26/08
(52) U.S. Cl. .......................... 359/198; 359/196; 359/197; 359/199; 359/200; 310/67 R; 310/91; 310/217; 347/260
(58) Field of Search .................................. 359/196, 197, 359/198, 199, 200; 347/260, 26; 310/67 R, 91, 217

(56) References Cited

U.S. PATENT DOCUMENTS

| 4,763,199 | 8/1988 | Suzuki | 358/280 |
| 4,878,068 | 10/1989 | Suzuki | 346/108 |
| 4,905,023 | 2/1990 | Suzuki | 346/108 |
| 5,365,259 | 11/1994 | Kanoto et al. | 346/108 |
| 5,642,150 | * 6/1997 | Takahashi | 347/257 |
| 5,670,837 | * 9/1997 | Boutaghou et al. | 310/67 R |
| 5,731,831 | 3/1998 | Murabe et al. | 347/259 |
| 5,831,363 | * 11/1998 | Fukita et al. | 310/67 R |
| 5,835,124 | 11/1998 | Fukita et al. | 347/260 |

FOREIGN PATENT DOCUMENTS 6-123850  5/1994  (JP) .

* cited by examiner

Primary Examiner—Cassandra Spyrou
Assistant Examiner—Craig Curtis
(74) Attorney, Agent, or Firm—Fitzpatrick, Cella, Harper & Scinto

(57) ABSTRACT

A rotary apparatus includes a stator portion, a rotor portion rotatably supported by the stator portion and including a permanent magnet, a ring-shaped stator core arranged opposingly to the permanent magnet and including a plurality of electromagnetic coils wound around a plurality of locations of the stator core discretely existing along its circumferential direction, and a ring member for supporting a free end of the stator core.

19 Claims, 3 Drawing Sheets

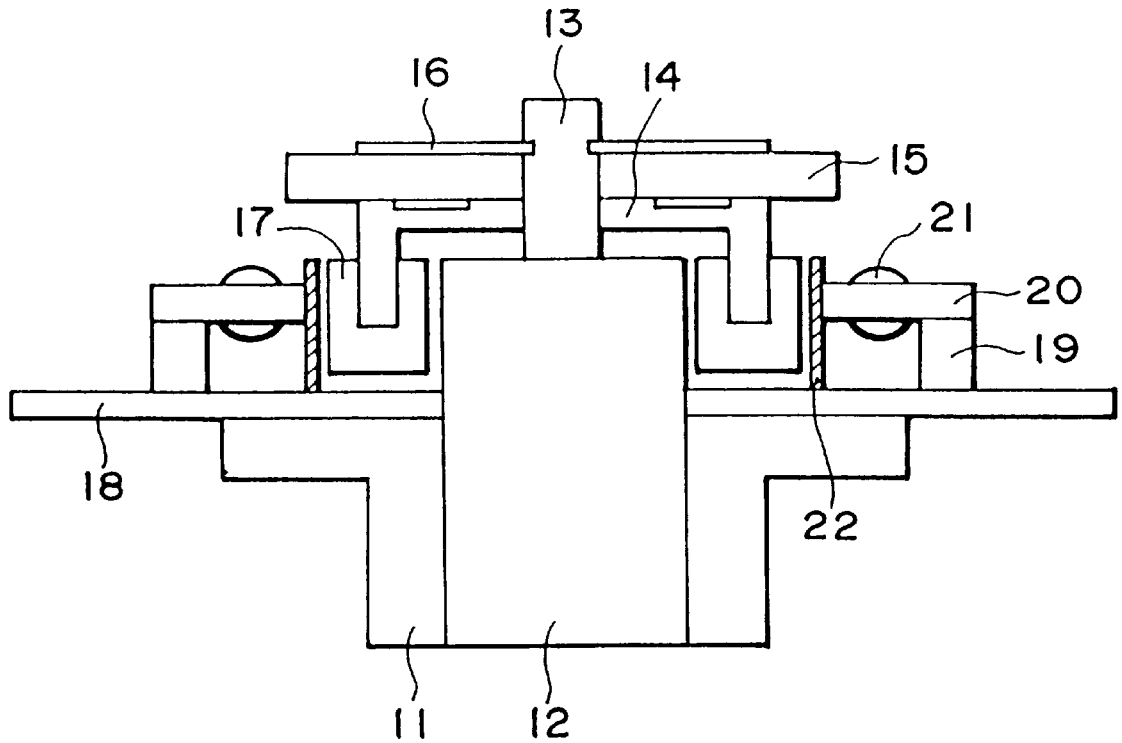
F I G. 3

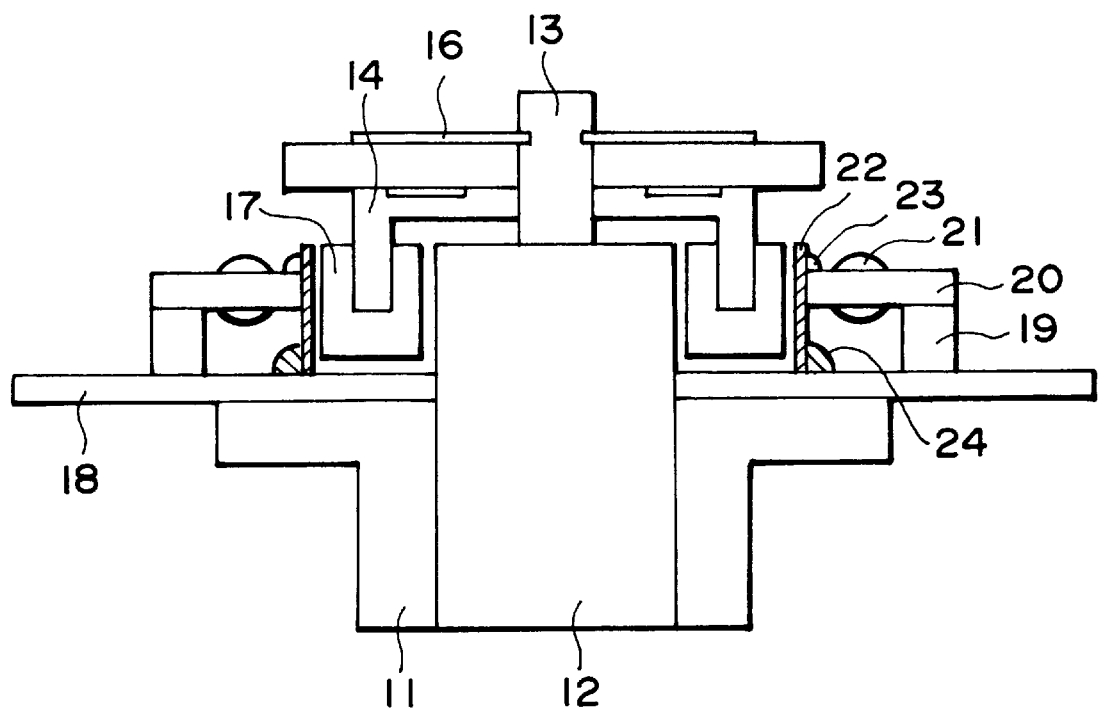
F I G. 4
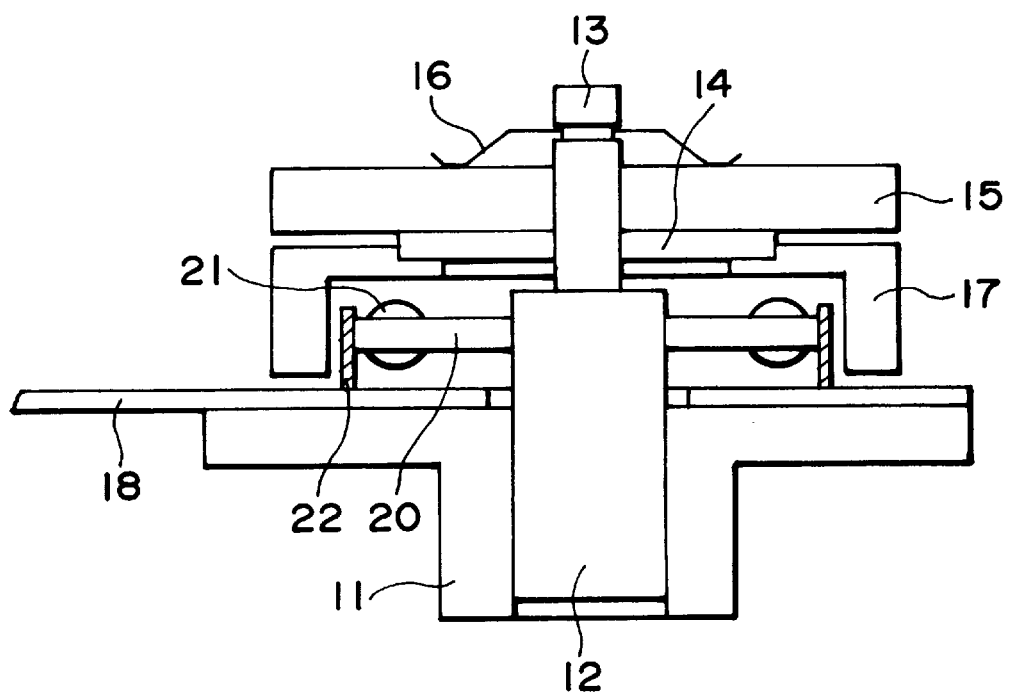
F I G. 5

ROTARY APPARATUS AND DEFLECTION-SCANNING APPARATUS USING THE ROTARY APPARATUS

BACKGROUND OF THE INVENTION

1. Field of the Invention

The present invention relates to a rotary apparatus usable as a driver in a rotary mechanism used in a light deflector of an image forming apparatus in a digital copying machine, a laser beam printer, or the like, and a deflection-scanning apparatus using the rotary apparatus.

2. Related Background Art

FIG. 1 is a view illustrating the overall structure of a scanning optical system with a deflection-scanning apparatus. As illustrated in FIG. 1, a laser unit 2 is mounted in an optical box 1, a rotary polygonal mirror 3 of the deflection-scanning apparatus and lenses 4 and 5 are arranged along an optical path L emerging from the laser unit 2 in the optical box 1, and a photosensitive member 6 of a recording medium is disposed outside of the optical box 1.

Laser light emerging from the laser unit 2 is deflected by the rotary polygonal mirror 3 rotatably supported by a bearing apparatus, transmitted through the lenses 4 and 5 and projected as a light spot on the photosensitive member 6 disposed outside of the optical box 1. A main scan is thus performed.

In the vicinity of the photosensitive member 6, there are arranged a corona discharger for uniformly electrifying a surface of the photosensitive member 6, a developing unit for visualizing an electrostatic latent image formed on the surface of the photosensitive member 6 to obtain a toner image, a transferor for transferring the toner image to a recording paper, and the like. Recording information of the laser light generated by the laser unit 2 is thus printed on the recording paper or the like.

For example, in a deflection-scanning apparatus as illustrated in FIG. 2 which is disclosed in Japanese Patent Application Laid-Open No. 6-123850, a rotary polygonal mirror 3 is supported rotatably about a fixed shaft 31 through a flange 27 and is rotatable at a high speed by means of a magnetic action between a permanent magnet 30 on a rotor side and a yoke 32 with an electromagnetic coil 33 on a stator side opposed to the rotor side.

However, since the yoke 32 is supported in a cantilever manner, vibrations occur due to the rotation of the rotor caused by a change of poles. The vibration adversely influences a life of the rotary apparatus and a deflection precision of the beam deflected by the deflection-scanning apparatus.

SUMMARY OF THE INVENTION

An object of the present invention is to provide a rotary apparatus in which a vibration due to its rotation is difficult to occur.

Another object of the present invention is to provide a deflection-scanning apparatus which uses the rotary apparatus to enhance a precision of a beam deflection.

A rotary apparatus of the present invention for achieving the above object includes a stator portion, a rotor portion which is rotatably supported by the stator portion and includes a permanent magnet, a ring-shaped stator core which is arranged opposingly to the permanent magnet and includes a plurality of electromagnetic coils wound around a plurality of locations of the stator core discretely existing along its circumferential direction, and a ring member which supports a free end of the stator core.

Further, in a deflection-scanning apparatus of the present invention for achieving the above object, a deflector, such as a rotary polygonal mirror, is rotated by a rotary apparatus, which includes a stator portion, a rotor portion which is rotatably supported by the stator portion and includes a permanent magnet, a ring-shaped stator core which is arranged opposingly to the permanent magnet and includes a plurality of electromagnetic coils wound around a plurality of locations of the stator core discretely existing along its circumferential direction, and a ring member which supports a free end of the stator core.

BRIEF DESCRIPTION OF THE DRAWINGS

FIG. 3 is a view illustrating the structure of a first embodiment according to the present invention.

FIG. 4 is a view illustrating the structure of a second embodiment according to the present invention.

FIG. 5 is a view illustrating the structure of a third embodiment according to the present invention.

DETAILED DESCRIPTION OF THE PREFERRED EMBODIMENTS

Figure 1:
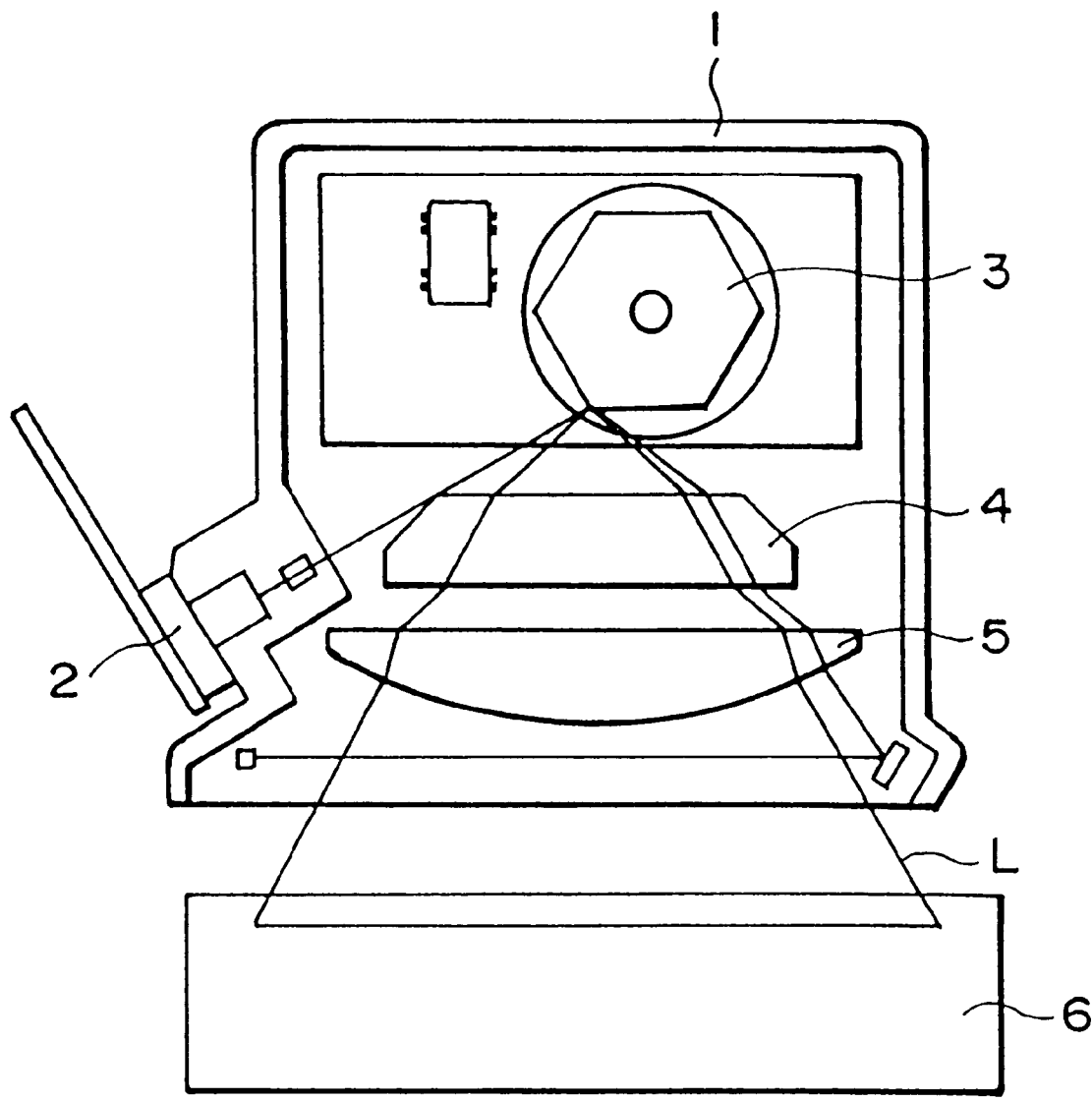
FIG. 1 is a view illustrating the structure of a prior art scanning optical system.
Figure 2:
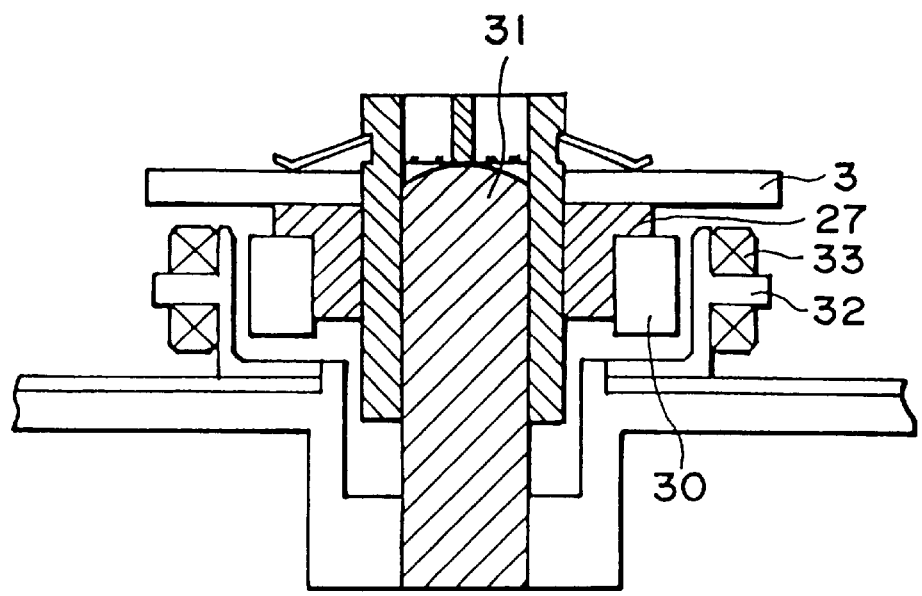
FIG. 2 is a view illustrating the structure of a prior art deflection-scanning apparatus.

Embodiments of the present invention will be described with reference to FIGS. 3 to 5.

FIG. 3 illustrates the structure of a first embodiment. FIG. 3 shows a deflection-scanning apparatus with a rotary apparatus to be used in an scanning optical system. A bearing portion 12 is fixed to a housing 11 of a stator portion, and a rotary shaft 13 is rotatably mounted to the bearing portion 12. A washer member 14 of a rotor portion is fixed to the rotary shaft 13, and a rotary polygonal mirror 15 is mounted on the washer member 14 and fixed thereto by a hold-down spring 16. The periphery of the washer member 14 extends downward in a cylindrical form, and an annular permanent magnet 17 is mounted to the cylindrically-extending portion of the washer member 14. A base plate 18 provided with an electric circuit is mounted on an upper portion of the housing 11. A ring-shaped stator core 20 is mounted on the substrate 18 through a support member 19 so that the stator core 20 faces the permanent magnet 17. Electromagnetic coils 21 are wound around circumferentially different portions of the stator core 20, respectively. An inner circumferential face of a free end of the stator core 20 is supported by force-fitting of a non-magnetic, non-conductive and cylindrical ring member 22 provided on the base plate 18.

According to the above structure, the rotation of the permanent magnet 17 causes the polarity to switch, and a force in the rotating direction is exerted on the stator core 20. In this occasion, occurrence of vibrations is prevented because the stator core 20 is firmly fixed by the support member 19 and the ring member 22.

A spacing in a radial direction between the permanent magnet 17 and the stator core 20 is ordinarily about 1 mm, so that the ring member 22 with a thickness of about 0.5 mm can be force-fitted into the spacing. Material of the ring member 22 is preferably a general resin. However, material with carbon or the like mixed therein is not preferable since such material causes eddy currents and increases a value of steady current. Therefore, resin material with dielectric material such as glass added thereto to improve its rigidity is preferable.

In a second embodiment illustrated in FIG. 4, a ring member 22 is bonded to a stator core 20 with an adhesive 23 and further bonded to a base plate 18 with an adhesive 24. The stator core 20 is hence firmly bonded to the ring member 22 and the base plate 18, so the vibration can be suppressed.

In the above embodiments, a so-called inner rotor type in which the rotor is arranged inside of a magnetic circuit is described, but the present invention can also be applied to an outer rotor type in which the rotor is arranged outside of the magnetic circuit. A third embodiment illustrated in FIG. 5 is directed to an outer rotor type wherein a ring member 22 is force-fitted into the periphery of a free end of a stator core 20 such that the above-discussed same technical advantage can be obtained. In FIG. 5, the same reference numerals as those in FIG. 3 designate the same members. An inner peripheral surface of the stator core 20 is directly fixed to a bearing portion 12.

Although the ring member in the above embodiments is formed of non-magnetic and non-conductive material, materials other than such material can also be used. Metal can also be used, for example. Where the metal ring member is used, eddy current occurs and a value of steady current increases. Thus, a load is given to the motor. However, the metal is stronger than the resin material, so that the occurrence of vibration can be advantageously prevented.

Thus, the stator core 20 is firmly fixed by the ring member 22 along its circumference, so that the rigidity of the stator core 20 can be increased and the vibration due to the electromagnetic force acting when the magnetic pole of the rotor passes the front of the electromagnetic coil 21 as the rotor rotates can be suppressed. Hence, noises due to the vibration, such as noise whose frequency is a multiple, by the number of poles of the permanent magnet 17, of a fundamental frequency determined by the rotation number of the motor apparatus, can be suppressed.

Further, since the stator core 20 is entirely fixed firmly, it is difficult to transfer the vibration due to imbalance of the rotor to the stator core 20. As a result, the vibration with the fundamental frequency and the noise due to this vibration can be suppressed.

Furthermore, when that deflection-scanning apparatus is used in a scanning optical apparatus, such as the laser beam printer as illustrated in FIG. 1, the vibration with the fundamental frequency can be suppressed and a relative positional deviation between the scanning optical apparatus and the photosensitive member can be prevented. Thus, a so-called pitch variation on the image formed by the scanning can be prevented, and a preferable image can be formed.

As described in the foregoing, the stator core is held by the ring member in the rotary apparatus of the present invention, so that the occurrence of vibration due to the rotation can be prevented.

Further, in the deflection-scanning apparatus of the present invention, a beam can be deflected with a high precision by using that rotary apparatus.

What is claimed is:

1. A rotary apparatus comprising:

a stator portion;

a rotor portion, said rotor portion being rotatably supported by said stator portion and including a permanent magnet;

a ring-shaped stator core, said stator core being arranged opposingly to said permanent magnet and including a plurality of electromagnetic coils wound around a plurality of locations of said stator core discretely existing along a circumferential direction; and a ring member, said ring member contacting and supporting a free end of said stator core.

2. A rotary apparatus according to claim 1, wherein said ring member is fixed to said stator core by force-fitting.

3. A rotary apparatus according to claim 1, wherein said ring member is made of non-magnetic and non-electrically-conductive material.

4. A rotary apparatus according to claim 1, wherein said ring member is fixed to said stator core by bonding.

5. A light deflecting apparatus comprising:

a stator portion;

a rotor portion, said rotor portion being rotatably supported by said stator portion and including a permanent magnet;

a ring-shaped stator core, said stator core being arranged opposingly to said permanent magnet and including a plurality of electromagnetic coils wound around a plurality of locations of said stator core discretely existing along a circumferential direction;

a ring member, said ring member contacting and supporting a free end of said stator core; and a deflector for performing a deflection-scan of a light beam.

6. A light deflecting apparatus according to claim 5, wherein said deflector comprises a rotary polygonal mirror.

7. A light deflecting apparatus according to claim 5, wherein said ring member is fixed to said stator core by force-fitting.

8. A light deflecting apparatus according to claim 5, wherein said ring member is made of non-magnetic and non-electrically-conductive material.

9. A light deflecting apparatus according to claim 5, wherein said ring member is fixed to said stator core by bonding.

10. A deflection-scanning apparatus comprising:

a light source for emitting a light beam;

a stator portion;

a rotor portion, said rotor portion being rotatably supported by said stator portion and including a permanent magnet;

a ring-shaped stator core, said stator core being arranged opposingly to said permanent magnet and including a plurality of electromagnetic coils wound around a plurality of locations of said stator core discretely existing along a circumferential direction;

a ring member, said ring member contacting and supporting a free end of said stator core; and a deflector for performing a deflection-scan of the light beam from said light source, said deflector being mounted to said rotor portion.

11. A deflection-scanning apparatus according to claim 10, wherein said deflector comprises a rotary polygonal mirror.

12. A deflection-scanning apparatus according to claim 10, wherein said ring member is fixed to said stator core by force-fitting.

13. A deflection-scanning apparatus according to claim 10, wherein said ring member is made of non-magnetic and non-electrically-conductive material.

14. A deflection-scanning apparatus according to claim 10, wherein said ring member is fixed to said stator core by bonding.

15. An image forming apparatus comprising:

a light source for emitting a light beam;

a recording medium;

a stator portion;

a rotor portion, said rotor portion being rotatably supported by said stator portion and including a permanent magnet;

a ring-shaped stator core, said stator core being arranged opposingly to said permanent magnet and including a plurality of electromagnetic coils wound around a plurality of locations of said stator core discretely existing along a circumferential direction;

a ring member, said ring member contacting and supporting a free end of said stator core; and a deflector for performing a deflection-scan of the light beam from said light source, said deflector being mounted to said rotor portion.

16. An image forming apparatus according to claim 15, wherein said deflector comprises a rotary polygonal mirror.

17. An image forming apparatus according to claim 15, wherein said ring member is fixed to said stator core by force-fitting.

18. An image forming apparatus according to claim 15, wherein said ring member is made of non-magnetic and non-electrically-conductive material.

19. An image forming apparatus according to claim 15, further comprising a member, wherein said member is fixed to said stator core by bonding and mounted to said ring member.

* * * * *